(12) United States Patent
Koudai et al.

(10) Patent No.: US 12,735,044 B2
(45) Date of Patent: Sep. 15, 2026

(54) TURNING SYSTEM AND CONTROL INFORMATION SETTING METHOD

(71) Applicant: JTEKT CORPORATION, Kariya (JP)

(72) Inventors: Takashi Koudai, Okazaki (JP); Kenichi Abe, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 102 days.

(21) Appl. No.: 18/667,041

(22) Filed: May 17, 2024

(65) Prior Publication Data

US 2024/0391465 A1 Nov. 28, 2024

(30) Foreign Application Priority Data

May 24, 2023 (JP) ................................ 2023-085556

(51) Int. Cl.
*B60W 30/182* (2020.01)
*B60W 10/20* (2006.01)
*B60W 50/00* (2006.01)

(52) U.S. Cl.
CPC .......... *B60W 30/182* (2013.01); *B60W 10/20* (2013.01); *B60W 50/00* (2013.01); *B60W 2050/0083* (2013.01)

(58) Field of Classification Search
CPC ......... B60W 10/20; B60W 2050/0083; B60W 30/182; B60W 50/00; B62D 15/0245; B62D 5/0457
See application file for complete search history.

(56) References Cited

U.S. PATENT DOCUMENTS 6,118,869 A * 9/2000 Kelem ..................... G11C 7/24 380/46
6,671,804 B1 * 12/2003 Kent .................. H04L 63/0823 713/161
9,020,702 B2 4/2015 Suzuki
9,558,602 B1 * 1/2017 Straz ................. G07C 9/00896
10,583,856 B2 3/2020 Miyashita
(Continued)

FOREIGN PATENT DOCUMENTS

CN 110316245 A 10/2019
GB 2 420 103 A 5/2006
(Continued)

OTHER PUBLICATIONS

Oct. 23, 2024 Extended Search Report issued in European Patent Application No. 24176996.7.

*Primary Examiner* — Carl C Staubach
(74) *Attorney, Agent, or Firm* — Oliff PLC

(57) ABSTRACT

A turning system applied to a vehicle steering system, includes a turning unit, one or more processors, and a memory. The vehicle steering system has a structure in which a power transmission path between the turning unit and the steering unit steered by a driver is cut off. The one or more processors are configured to execute a mode setting process of setting a control mode in which the turning unit is operated to a setting mode or a normal control mode. The setting mode is a mode that is settable in an in-factory step before the turning unit is shipped to market. The normal control mode is a mode that is settable after the in-factory step is gone through. The mode setting process includes exclusively setting the setting mode or the normal control mode.

4 Claims, 8 Drawing Sheets

(56) References Cited

U.S. PATENT DOCUMENTS

| | | | | |
|---|---|---|---|---|
| 2014/0100726 | A1 * | 4/2014 | Reynolds | B60W 20/50 903/930 |
| 2014/0277893 | A1 * | 9/2014 | Rosol | B62D 6/00 701/23 |
| 2014/0343791 | A1 * | 11/2014 | Suzuki | B62D 15/0235 701/41 |
| 2018/0208235 | A1 * | 7/2018 | Miyashita | B62D 5/003 |
| 2018/0346018 | A1 * | 12/2018 | Kataoka | B62D 5/0463 |
| 2019/0300052 | A1 * | 10/2019 | Allan | B62D 15/0245 |
| 2020/0103899 | A1 * | 4/2020 | Zhu | B60W 50/0098 |
| 2020/0255060 | A1 | 8/2020 | Mueller | |
| 2022/0033000 | A1 * | 2/2022 | Koo | B62D 15/02 |
| 2023/0044311 | A1 * | 2/2023 | Matsuo | G01S 7/403 |
| 2023/0294761 | A1 * | 9/2023 | Kakimoto | B62D 5/001 701/41 |
| 2024/0227916 | A1 * | 7/2024 | Fehr | B62D 5/0457 |
| 2024/0227933 | A1 * | 7/2024 | Kakas | B62D 6/008 |
| 2024/0391465 | A1 * | 11/2024 | Koudai | B60W 50/00 |

FOREIGN PATENT DOCUMENTS

| | | | |
|---|---|---|---|
| JP | 2007-230275 | A | 9/2007 |
| WO | 2008/018593 | A1 | 2/2008 |
| WO | 2023/046270 | A1 | 3/2023 |
| WO | 2023/046273 | A1 | 3/2023 |

* cited by examiner

VEHICLE CONTROL DEVICE
STEERING CONTROL DEVICE
SW
Th
θa
θabp
θb
θi
V
L1
L2

FIG. 2

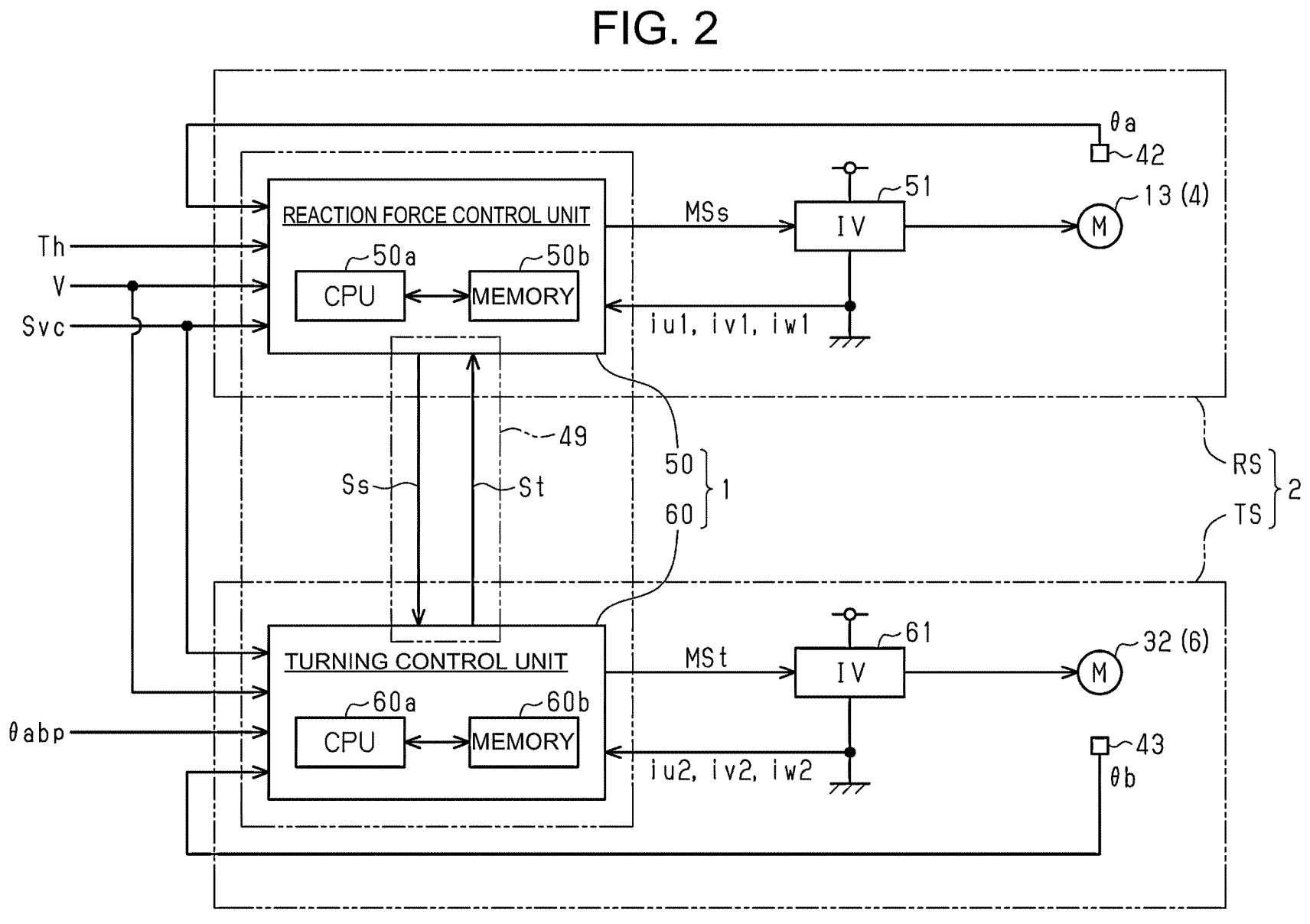

REACTION FORCE CONTROL UNIT
CPU
50a
MEMORY
50b
TURNING CONTROL UNIT
CPU
60a
MEMORY
60b
49
St
Ss
50
60
1
MSs
iu1, iv1, iw1
MSt
iu2, iv2, iw2
IV
51
IV
61
M
13 (4)
M
32 (6)
θa
42
θb
43
RS
TS
2
Th
V
Svc
θabp

TURNING SYSTEM AND CONTROL INFORMATION SETTING METHOD

CROSS-REFERENCE TO RELATED APPLICATION

This application claims priority to Japanese Patent Application No. 2023-085556 filed on May 24, 2023, incorporated herein by reference in its entirety.

BACKGROUND

1. Technical Field

The present disclosure relates to a turning system and a control information setting method.

2. Description of Related Art

Conventionally, a vehicle steering system is known to require setting work for enabling the vehicle to travel appropriately. For example, regarding a vehicle steering system including an electric power-assisted steering device, Japanese Unexamined Patent Application Publication No. 2007-230275 (JP 2007-230275 A) proposes a method of setting work for detecting a state corresponding to straight forward movement of the vehicle. This method of the setting work involves performing a rack neutral point recognition operation of calculating a neutral point of a rack shaft etc. on the condition that a rack neutral point recognition switch is turned on by a driver.

SUMMARY

Since the setting work in JP 2007-230275 A described above is performed on the condition that the rack neutral point recognition switch is turned on by the driver, only the work after shipment to market is assumed. Thus, when the work in an in-factory step before shipment to market is assumed, room for improvement remains.

A turning system according to a first aspect of this disclosure is a turning system applied to a vehicle steering system includes a turning unit that operates to turn a turning wheel of a vehicle, one or more processors that control the operation of the turning unit, and a memory that stores control information that the one or more processors use to control the operation of the turning unit. The vehicle steering system has a structure in which a power transmission path between the turning unit and a steering unit steered by a driver is cut off. The one or more processors are configured to execute a mode setting process of setting a control mode in which the turning unit is operated to a setting mode or a normal control mode. The setting mode is a mode that is settable in an in-factory step before the turning unit is shipped to market, and is a mode in which setting work for setting the control information in the memory by operating the turning unit is performed. The normal control mode is a mode that is settable after the in-factory step is gone through, and is a mode in which the turning unit is controlled to operate using the control information. The mode setting process includes exclusively setting the setting mode or the normal control mode.

According to this configuration, it is possible to make the turning unit operate according to each situation in the setting mode and the normal control mode. Thus, in the setting mode, the one or more processors can execute control based on the assumption of work in the in-factory step before shipment to market, whereas in the normal control mode, the one or more processors can execute control based on the assumption of use after the in-factory step is gone through, for example, after shipment to market. Such a setting mode or a normal control mode is exclusively set according to the situation, which can, for example, reduce the confusion of a worker engaged in the setting work in the in-factory step. Therefore, the setting work in the in-factory step before shipment to market can be appropriately performed.

In the above turning system, the turning unit may include a turning shaft that operates to turn the turning wheel, and a turning-side motor that generates motive power for operating the turning shaft. The one or more processors may be configured to execute an in-factory turning process involved in performing the setting work, and the in-factory turning process may include a process of setting the control information in the memory by making the turning shaft perform at least one specified operation that is specified beforehand through driving of the turning-side motor.

According to this configuration, a turning system can be proposed that is suited to the setting work that is performed by operating the turning shaft among types of setting work in the in-factory step before shipment to market.

In the above turning system, the setting work may include work for setting a reference value that is a value linked to a mechanical state of the turning unit in the memory as the control information. The reference value may be a value indicating a moving-straight-forward state that is a turning state of the turning shaft when the vehicle moves straight forward. The specified operations may include a learning operation of moving the turning shaft to a motion limit in each of a first direction and a second direction. The in-factory turning process may include acquiring, during the learning operation, a limit position in each of the first and second directions that is a position of the turning shaft at the motion limit in each of the first and second directions, and setting the reference value based on the limit position acquired in each of the first and second directions.

According to this configuration, it is possible to specialize in the setting work for setting the reference value among types of setting work that are performed by operating the turning shaft.

In the above turning system, the in-factory turning process may further include a process of setting, in the memory, completion information showing completion of setting of the reference value on the condition that the reference value has been set in the memory through the learning operation. The mode setting process may further include setting the normal control mode when the completion information is set in the memory, and setting the setting mode when the completion information is not stored in the memory.

According to this configuration, the one or more processors can exclusively set the setting mode or the normal control mode based on the completion information, and can automatically perform such setting. This is effective, for example, in automating the in-factory step before shipment to market.

In the above turning system, the in-factory turning process may include performing a holding operation of holding a state of the turning shaft at the start of the process and each time the specified operation is completed. According to this configuration, the turning shaft is less likely to become displaced due to, for example, impact being exerted from the outside in the in-factory step before shipment to market. Thus, work efficiency in the in-factory step can be improved.

A control information setting method according to a second aspect of this disclosure is a method for setting control information that is applied to a vehicle steering system having a structure in which a power transmission path between a steering unit that is steered by a driver and a turning unit that operates to turn a turning wheel of a vehicle is cut off. The control information is information that is stored in a memory belonging to a turning system configured to include the turning unit and that is used by one or more processors belonging to the turning system to control the operation of the turning unit. The control information setting method includes, by one or more processors, executing, an in-factory turning process of operating the turning unit to perform setting work for setting the control information in the memory by operating the turning unit, in a setting mode that is settable in an in-factory step before the turning unit is shipped to market. The in-factory turning process includes setting the control information in the memory by making a turning shaft of the turning unit that operates to turn the turning wheel perform at least one specified operation that is specified beforehand through driving of a turning-side motor of the turning unit.

According to this method, it is possible to make the turning unit operate according to the in-factory step before shipment to market in the setting mode. Thus, in the setting mode, the one or more processors can execute control based on the assumption of work in the in-factory step before shipment to market, which can, for example, reduce the confusion of a worker engaged in the setting work in the in-factory step. Among such types of setting work in the in-factory step before shipment to market, the setting work that is performed by operating the turning shaft can be appropriately performed.

According to the present disclosure, the setting work in the in-factory step before shipment to market can be appropriately performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram showing the electrical configuration of a steering control device of FIG. 1;

DETAILED DESCRIPTION OF EMBODIMENTS

Figure 1:
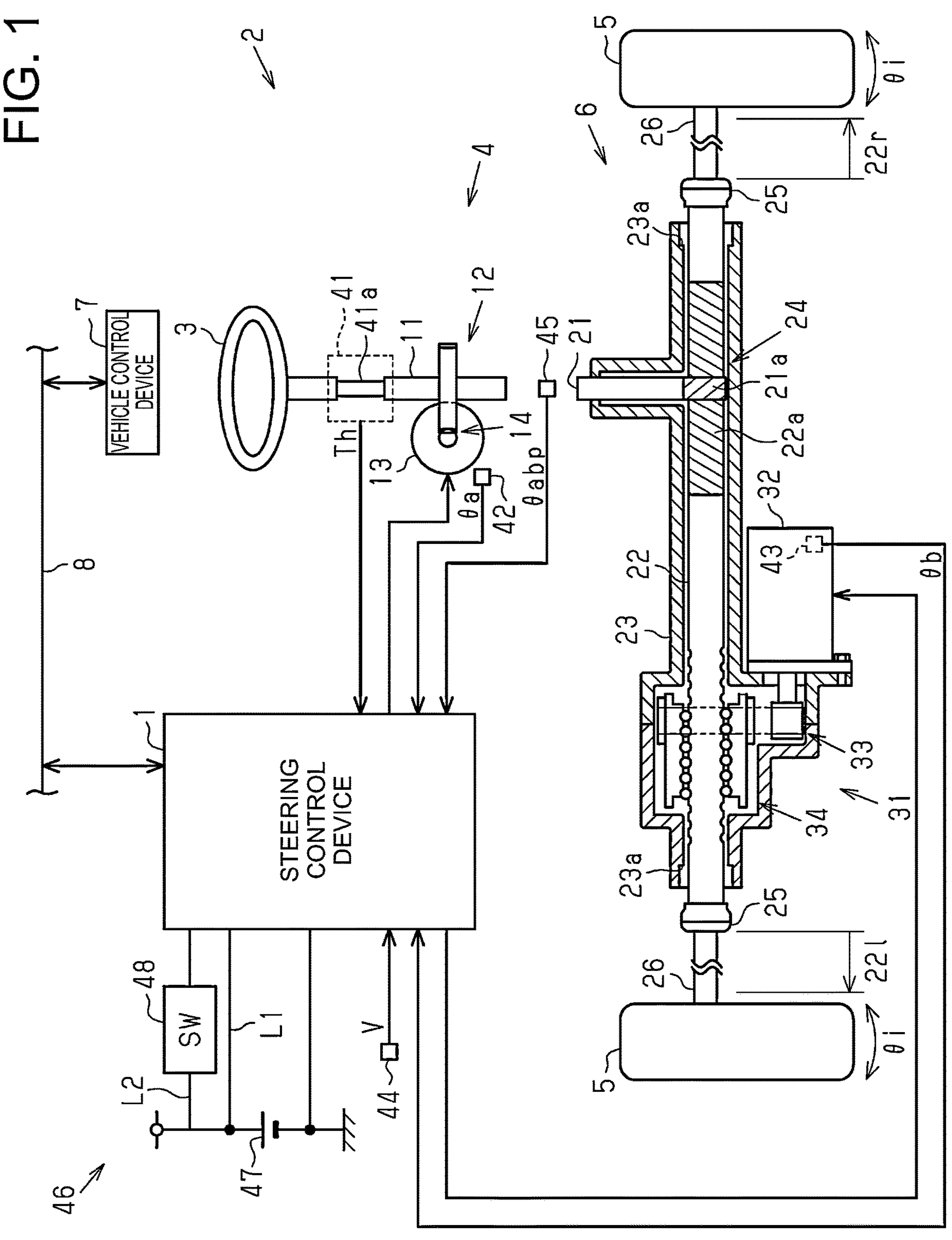
FIG. 1 is a diagram showing the configuration of a steer-by-wire steering device according to an embodiment.

A turning device according to one embodiment will be described. As shown in FIG. 1, a vehicle steering system 2 includes a steering control device 1. The vehicle steering system 2 includes a steering unit 4 and a turning unit 6. The steering unit 4 is steered by a driver through a steering wheel 3 of a vehicle that is a steering member. The turning unit 6 turns left and right turning wheels 5 of the vehicle according to steering that is input into the steering unit 4 by the driver. The vehicle steering system 2 of this embodiment has, for example, a structure in which a power transmission path between the steering unit 4 and the turning unit 6 is mechanically always cut off. In this structure, a power transmission path between a steering actuator 12, to be described later, and a turning actuator 31, to be described later, is mechanically always cut off. Thus, the vehicle steering system 2 includes a steer-by-wire steering device.

The steering unit 4 includes a steering shaft 11 and the steering actuator 12. The steering shaft 11 is coupled to the steering wheel 3. The steering actuator 12 has a steering-side motor 13 and a steering-side speed reduction mechanism 14. The steering-side motor 13 is a reaction force motor that applies a steering reaction force that is a force resisting steering to the steering wheel 3 through the steering shaft 11. The steering-side motor 13 is coupled to the steering shaft 11 through the steering-side speed reduction mechanism 14 that is formed by, for example, a worm-and-wheel. As the steering-side motor 13 of this embodiment, for example, a three-phase brushless motor is adopted.

The turning unit 6 includes a pinion shaft 21, a rack shaft 22 as a turning shaft, and a rack housing 23. The pinion shaft 21 and the rack shaft 22 are coupled together at a predetermined intersection angle. Pinion teeth 21*a* formed on the pinion shaft 21 and rack teeth 22*a* formed on the rack shaft 22 are meshed with each other to form a rack-and-pinion mechanism 24. The pinion shaft 21 represents a rotating shaft of which rotation can be converted into a turning angle $\theta i$ that is a turning position of the turning wheels 5. The rack housing 23 houses the rack-and-pinion mechanism 24.

One end of the pinion shaft 21 on the opposite side from a side coupled to the rack shaft 22 protrudes from the rack housing 23. Both ends of the rack shaft 22 protrude from both ends of the rack housing 23 in an axial direction. Tie rods 26 are coupled to both ends of the rack shaft 22 through rack ends 25 that are formed by ball joints. Leading ends of the tie rods 26 are coupled to knuckles (not shown) on which the left and right turning wheels 5 are respectively mounted.

The turning unit 6 includes the turning actuator 31. The turning actuator 31 includes a turning-side motor 32, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts the rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted.

In the vehicle steering system 2, the turning angle $\theta i$ of the turning wheels 5 changes as a motor torque is applied as the turning force from the turning actuator 31 to the rack shaft 22 according to the driver's steering operation. Meanwhile, the steering reaction force resisting the driver's steering is applied from the steering actuator 12 to the steering wheel 3. Thus, in the vehicle steering system 2, a steering torque Th required to steer the steering wheel 3 is changed by the steering reaction force that is the motor torque applied from the steering actuator 12.

A motion range of the rack shaft 22 is defined by end portions 23*a* of the rack housing 23 on both sides in the axial direction. For example, the rack shaft 22 can move between a rightward motion limit 22*r* and a leftward motion limit 221 as the motion range. The motion limits 22*r*, 221 of the rack shaft 22 are end contact positions at which motion of the rack shaft 22 in the axial direction is mechanically restricted as the rack ends 25 come into contact with the respective end portions 23*a* of the rack housing 23 while the rack shaft 22 moves in the axial direction. The motion range of the rack shaft 22 defines a turning range of the turning wheels 5.

The reason for providing the pinion shaft 21 is to support the rack shaft 22 along with the pinion shaft 21 inside the rack housing 23. By a support mechanism (not shown) provided in the vehicle steering system 2, the rack shaft 22 is supported so as to be movable along the axial direction thereof while being pressed toward the pinion shaft 21. Thus, the rack shaft 22 is supported inside the rack housing 23. However, another support mechanism that supports the rack shaft 22 in the rack housing 23 without using the pinion shaft 21 may be provided.

Electrical Configuration of Vehicle Steering System

As shown in FIG. 1, the steering-side motor 13 and the turning-side motor 32 are connected to the steering control device 1. The steering control device 1 controls actuation of each of the motors 13, 32.

Detection results of various sensors are input into the steering control device 1. Examples of the various sensors include a torque sensor 41, a steering-side rotation angle sensor 42, a turning-side rotation angle sensor 43, a vehicle speed sensor 44, and a pinion absolute angle sensor 45.

The torque sensor 41 is provided on the steering shaft 11, at a portion between the steering wheel 3 and the steering-side speed reduction mechanism 14. The torque sensor 41 detects the steering torque Th that is a value indicating a torque applied to the steering shaft 11 by the driver's steering operation. The steering torque Th is detected in association with twisting of a torsion bar 41*a* that is an intermediate part of the steering shaft 11 and is provided in the steering shaft 11, between the steering wheel 3 and the steering-side speed reduction mechanism 14. The steering-side rotation angle sensor 42 is provided on the steering-side motor 13. The steering-side rotation angle sensor 42 detects a rotation angle θa that is an angle of a rotating shaft of the steering-side motor 13 within a range of 360 degrees. The turning-side rotation angle sensor 43 is provided on the turning-side motor 32. The turning-side rotation angle sensor 43 detects a rotation angle θb that is an angle of a rotating shaft of the turning-side motor 32 within a range of 360 degrees. The vehicle speed sensor 44 detects a vehicle speed V that is a travel speed of the vehicle. The pinion absolute angle sensor 45 detects a pinion absolute rotation angle θabp that is an actually measured value of an angle of a rotating shaft of the pinion shaft 21 within a range exceeding 360°.

A power source system 46 is connected to the steering control device 1. The power source system 46 has a battery 47. The battery 47 is a secondary battery installed in the vehicle, and serves as an electric power source of electric power that is supplied for the steering-side motor 13 and the turning-side motor 32 to operate. The battery 47 serves also as an electric power source of electric power that is supplied for the steering control device 1 to operate.

A start switch 48 (in FIG. 1, "SW") of the vehicle, such as an ignition switch, is provided between the steering control device 1 and the battery 47. Of two power supply lines L1, L2 that connect the steering control device 1 and the battery 47 to each other, the start switch 48 is provided at an intermediate point of the power supply line L2 that branches off from the power supply line L1. The start switch 48 is operated to actuate a drive source for traveling of the vehicle, such as an engine, and start various functions that enable the vehicle to operate. Conduction of the power supply line L2 is turned on and off through operation of the start switch 48. In this embodiment, an operation state of the vehicle steering system 2 is associated with an operation state of the vehicle. While basically conduction of the power supply line L1 is normally on, conduction of the power supply line L1 is indirectly turned on and off as a function of the vehicle steering system 2 according to the operation state of the vehicle steering system 2. The operation state of the vehicle steering system 2 is associated with on and off of conduction of the power supply lines L1, L2 that represent supply states of electric power of the battery 47. The operation state of the vehicle steering system 2 is "power source on" when conduction of the power supply lines L1, L2 is turned on based on operation of the start switch 48. The operation state of the vehicle steering system 2 is "power source off" when conduction of the power supply lines L1, L2 is turned off based on operation of the start switch 48.

A vehicle control device 7 is connected to the steering control device 1 through an on-board network 8, such as a CAN. The vehicle control device 7 is provided in the vehicle equipped with the vehicle steering system 2, separately from the steering control device 1. The vehicle control device 7 controls a system that controls a drive system involved in traveling of the vehicle, a system that controls a brake system involved in braking of the vehicle, etc.

Functions of Steering Control Device

As shown in FIG. 2, the steering control device 1 has a reaction force control unit 50 and a turning control unit 60. The reaction force control unit 50 controls the steering wheel 3 that is a control target. To control the steering reaction force that is a control amount of the control target, the reaction force control unit 50 controls driving of the steering actuator 12, more specifically the steering-side motor 13. The turning control unit 60 controls the rack shaft 22 that is a control target. To control the turning force that is a control amount of the control target, the turning control unit 60 controls driving of the turning actuator 31, more specifically the turning-side motor 32. The reaction force control unit 50 and the turning control unit 60 transmit and receive information to and from each other through a local network 49 of, for example, serial communication. In combination with the steering unit 4, the reaction force control unit 50 constitutes a reaction force system RS. In combination with the turning unit 6, the turning control unit 60 constitutes a turning system TS.

The reaction force control unit 50 includes a central processing unit (hereinafter referred to as a "CPU") 50*a* and a memory 50*b*. The reaction force control unit 50 executes various processes as the CPU 50*a* executes programs stored in the memory 50*b* on a predetermined arithmetic operation cycle. The turning control unit 60 includes a central processing unit (hereinafter referred to as a "CPU") 60*a* and a memory 60*b*. The turning control unit 60 executes various processes as the CPU 60*a* executes programs stored in the memory 60*b* on a predetermined arithmetic operation cycle. The CPUs 50*a*, 60*a* and the memories 50*b*, 60*b* constitute microcomputers that are processing circuits. The memories 50*b*, 60*b* include computer-readable media, such as a random-access memory (RAM) and a read-only memory (ROM). However, that various processes are realized by software is one example. The processing circuits belonging to the reaction force control unit 50 and the turning control unit 60 may be configured such that at least some of the processes are realized by a hardware circuit, such as a logic circuit. The CPU 60*a* belonging to the turning control unit 60 in this embodiment is one example of a control unit. The memory 60*b* belonging to the turning control unit 60 is one example of a storage unit.

The CPU 50*a* in the reaction force control unit 50 receives inputs of the steering torque Th, the vehicle speed V, the rotation angle θa, and turning information St. The turning information St is information that is obtained from the turning control unit 60 through the local network 49. In addition, the CPU 50*a* receives an input of vehicle information Svc from the vehicle control device 7 etc. through the on-board network 8. Based on the steering torque Th, the vehicle speed V, the rotation angle θa, the turning information St, and the vehicle information Svc, the CPU 50*a* calculates a control signal MSs to a reaction force inverter 51 for controlling the steering reaction force. The reaction force inverter 51 is a drive circuit that converts a direct-current voltage of the battery 47 into an alternating-current voltage and applies this voltage to the steering-side motor 13. In that process, the CPU 50*a* refers to currents iu1, iv1, iw1 that flow through the steering-side motor 13. The currents iu1, iv1, iw1 are quantified as an amount of voltage drop of a shunt resistor provided in each leg of the reaction force inverter 51. Thus, the CPU 50*a* controls driving of the steering-side motor 13 such that a motor torque serving as the steering reaction force is generated.

The CPU 50*a* converts the rotation angle θa into an integrated angle from a reaction force reference value θns stored in the memory 50*b*. The integrated angle is a value that is converted within a range exceeding 360° by counting the number of times of rotation of the steering-side motor 13 from the reaction force reference value θns. The reaction force reference value θns is, for example, a value indicating a moving-straight-forward state that is a steering state of the steering wheel 3 when the vehicle is moving straight forward. In this embodiment, the reaction force reference value θns is a value indicating a steering neutral position that is a rotation position of the steering wheel 3 in the moving-straight-forward state, and is one example of control information. The CPU 50*a* calculates a steering angle θs by multiplying the integrated angle obtained by conversion by a conversion factor based on a rotation speed ratio of the steering-side speed reduction mechanism 14. The CPU 50*a* calculates the steering angle θs as an absolute angle relative to the steering neutral position, i.e., the reaction force reference value θns. The steering angle θs thus obtained is used to calculate the control signal MSs. The steering information Ss, such as the steering angle θs, that the CPU 50*a* uses is output to the turning control unit 60 through the local network 49. The CPU 60*a* in the turning control unit 60 receives inputs of the vehicle speed V, the rotation angle θb, the pinion absolute rotation angle θabp, and the steering information Ss. The steering information Ss is information that is obtained from the reaction force control unit 50 through the local network 49. In addition, the CPU 60*a* receives an input of the vehicle information Svc from the vehicle control device 7 etc. through the on-board network 8. Based on the vehicle speed V, the rotation angle θb, the pinion absolute rotation angle θabp, the steering information Ss, and the vehicle information Svc, the CPU 60*a* calculates a control signal MSt to a turning inverter 61 for controlling the turning force. The turning inverter 61 is a drive circuit that converts a direct-current voltage of the battery 47 into an alternating-current voltage and applies this voltage to the turning-side motor 32. In that process, the CPU 60*a* refers to currents iu2, iv2, iw2 that flow through the turning-side motor 32. The currents iu2, iv2, iw2 are quantified as an amount of voltage drop of a shunt resistor provided in each leg of the turning inverter 61. Thus, the CPU 60*a* controls driving of the turning-side motor 32 such that a motor torque serving as the turning force is generated.

The CPU 60*a* converts the rotation angle θb into an integrated angle from a turning reference value θnt stored in the memory 60*b*. The integrated angle is a value that is converted within a range exceeding 360° by counting the number of times of rotation of the turning-side motor 32 from the turning reference value θnt. The turning reference value θnt is, for example, a value indicating the moving-straight-forward state that is a turning state of the rack shaft 22 when the vehicle is moving straight forward. In this embodiment, the turning reference value θnt is a value indicating a rack neutral position that is a position of the rack shaft 22 in the moving-straight-forward state, and is one example of the control information. The CPU 60*a* calculates a pinion angle θp by multiplying the integrated angle obtained by conversion by a conversion factor based on a rotation speed ratio of the transmission mechanism 33, a lead of the conversion mechanism 34, and a rotation speed ratio of the rack-and-pinion mechanism 24. The CPU 60*a* calculates the pinion angle θp that is an actual rotation angle of the pinion shaft 21, as an absolute angle relative to the rack neutral position, i.e., the turning reference value θnt. The pinion angle θp thus obtained is used to calculate the control signal MSt. The turning information St, such as the pinion angle θp, that the CPU 60*a* uses is output to the reaction force control unit 50 through the local network 49.

In this embodiment, the reaction force reference value θns is set in a state of the vehicle steering system 2 after the reaction force system RS and the turning system TS are incorporated. Thus, the reaction force reference value θns is set after the vehicle is shipped to market with the vehicle steering system 2 installed therein, in an environment where the vehicle, i.e., the vehicle steering system 2 is used by a driver.

On the other hand, the turning reference value θnt is set in a state of the turning system TS alone before the reaction force system RS and the turning system TS are incorporated. Thus, the turning reference value θnt is set in an in-factory step of manufacturing the turning system TS before the turning system TS is shipped to market, in an environment where the vehicle steering system 2 is not used by a driver.

State Transition of CPU in Turning Control Unit

Figure 3:
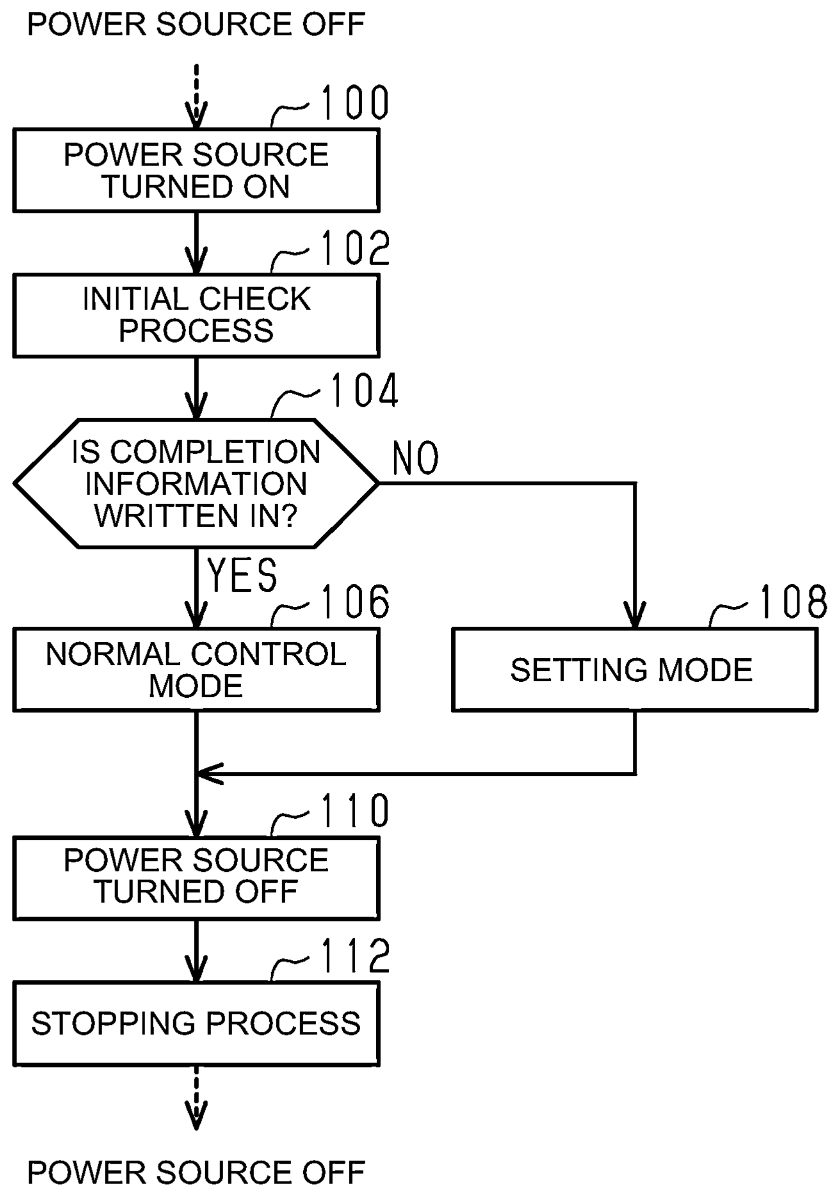
FIG. 3 is a chart for describing a state transition of a CPU in a turning control unit of FIG. 2.

As shown in FIG. 3, when, while the power source is off, the start switch 48 is turned on and the power source is turned on (step 100), then the CPU 60*a* executes an initial check process (step 102). In step 100, the CPU 60*a* determines the state of power source on or power source off according to whether an IG signal Sg output by the start switch 48 has been input.

The initial check process includes a check process relating to the operation of the turning system TS, as to whether the CPU 60*a* and the memory 60*b* can operate normally. The initial check process includes a check process relating to communication with the reaction force system RS, as to whether the steering information Ss can be input through the local network 49. The initial check process includes a check process relating to communication with the vehicle control device 7, as to whether the vehicle information Svc can be input through the on-board network 8. The initial check process includes a process for enabling execution of a process for operating the turning unit 6 by, for example, retrieving various pieces of information from the memory 60*b*. The various pieces of information that the CPU 60*a* retrieves from the memory 60*b* in the initial check process include contents of learning state information L.

Next, after completion of the initial check process in step 102, the CPU 60*a* determines whether completion information lc is written in the contents of the learning state information L (step 104). That the completion information lc is written in the contents of the learning state information L in step 104 shows that setting of the turning reference value θnt in the memory 60*b* has been completed. On the other hand, that the completion information 1*c* is not written in the contents of the learning state information L shows that setting of the turning reference value θnt in the memory 60*b* has not been completed.

Of information in the memory 60*b*, information that can be written in includes information of which the contents are deleted and initialized according to turning on and off of the power source, and information of which the contents are retained regardless of whether the power source is turned on and off. The information of the learning state information L corresponds to the information of which the contents are retained regardless of whether the power source is turned on and off. Further, the contents of the learning state information L cannot be deleted and initialized after the completion information lc is once written in. After the completion information lc is once written in, the contents of the learning state information L cannot be deleted and initialized unless, for example, the turning control unit 60 or the memory 60*b* is replaced with another new product. Thus, after the completion information lc is once written in and the turning system TS is shipped to market, the contents of the learning state information L cannot be deleted and initialized even at a maintenance factory, such as a dealer. In addition, the contents of the learning state information L are information that is retained without being deleted and initialized even by battery replacement.

Next, when the completion information lc is written in (step 104: YES), the CPU 60*a* moves to step 106 and sets a normal control mode Mn. The normal control mode Mn is a state in which a normal turning process relating to steering control for operating the turning unit 6 according to the driver's steering operation is executed in an environment where the vehicle steering system 2 is used by the driver. In this case, the turning system TS operates the turning unit 6 so as to operate in cooperation with the steering unit 4.

For example, the normal turning process includes a process of referring to the rotation angle θb input from the turning-side rotation angle sensor 43, the pinion absolute rotation angle θabp input from the pinion absolute angle sensor 45, and the turning reference value θnt stored in the memory 60*b*. The normal turning process includes a process of calculating the pinion angle θp from the rotation angle θb, the pinion absolute rotation angle θabp, and the turning reference value θnt. The normal turning process includes a process of referring to the steering angle θs in the steering information Ss input through the local network 49. The normal turning process includes a process of calculating a target pinion angle θp* that is a target value of the pinion angle θp based on the steering angle θs. The target pinion angle θp* is a value corresponding to the steering angle θs with a steering angle ratio taken into account. The steering angle ratio is a ratio between the steering angle θs and the pinion angle θp and changes according to the vehicle speed V etc. The normal turning process includes a process of calculating the control signal MSt by executing feedback control such that the pinion angle θp adapts to the target pinion angle θp*. Thus, the CPU 60*a* controls the operation of the turning unit 6 such that a positional relationship of the turning angle θi relative to the steering angle θs controlled by the reaction force system RS meets a predetermined correspondence relationship that is specified according to the steering angle ratio.

On the other hand, when the completion information lc is not written in (step 104: NO), the CPU 60*a* moves to step 108 and sets a setting mode Mf. The setting mode Mf is a state in which an in-factory turning process relating to setting work in the in-factory step for operating the turning unit 6 according to a command signal CMD from factory equipment Feq is executed in an environment where the vehicle steering system 2 is not used by a driver. In this case, the turning system TS operates the turning unit 6 so as to operate alone in the absence of the steering unit 4. The in-factory turning process will be described in detail later.

When, while the normal control mode Mn or the setting mode Mf is set, the start switch 48 is turned off and the power source is turned off (step 110), then the CPU 60*a* executes a stopping process (step 112). Thereafter, the CPU 60*a* stops operating. In step 112, the CPU 60*a* determines whether the IG signal Sg output by the start switch 48 has been input. The stopping process includes a process of stopping the turning system TS by, for example, writing various pieces of information in the memory 60*b*.

In this embodiment, the processes of step 104, step 106, and step 108 are one example of a mode setting process for exclusively setting the setting mode Mf or the normal control mode Mn.

Setting Work in In-Factory Step

Figure 4:
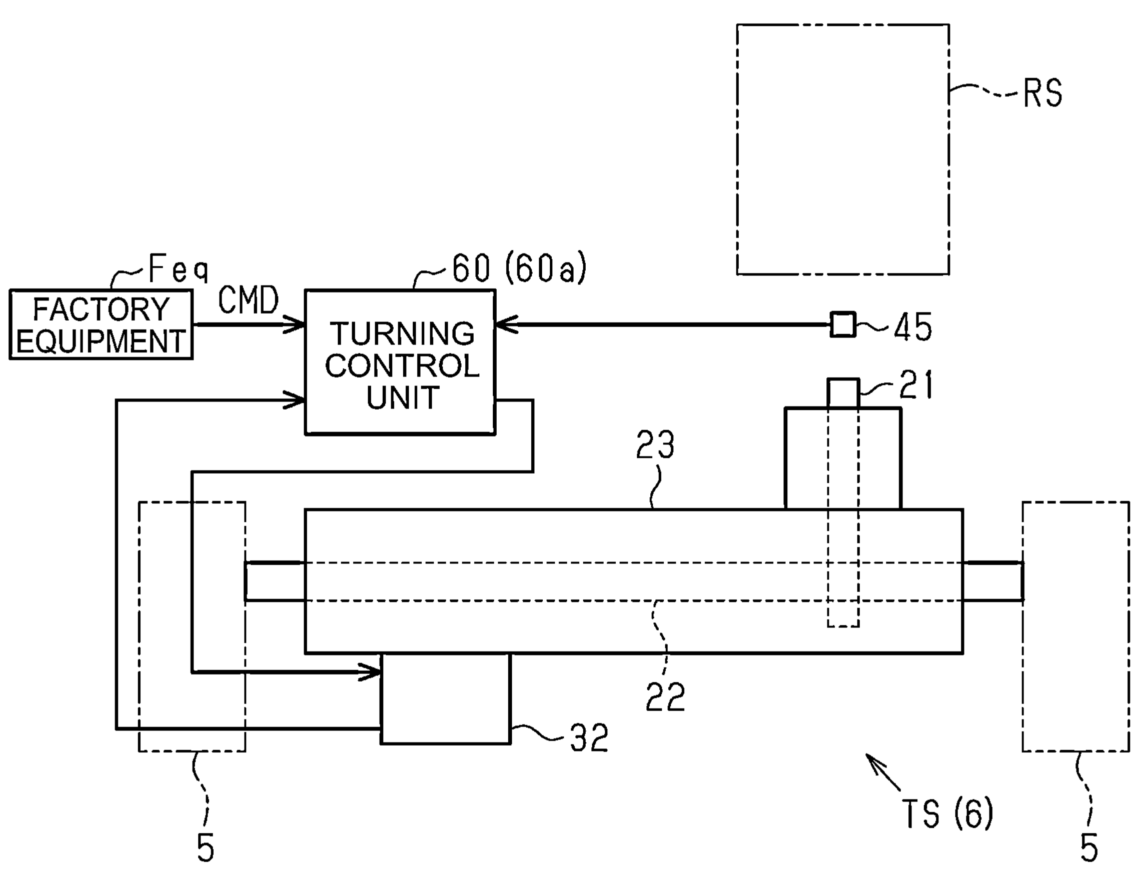
FIG. 4 is a diagram for describing setting work of a turning unit in an in-factory step.

FIG. 4 shows the turning system TS in the in-factory step before shipment to market. In the in-factory step, other than the turning system TS, the reaction force system RS is absent and the turning wheels 5 are also absent. In addition, the battery 47, the start switch 48, etc. are absent, and the turning system TS is not connected to the vehicle control device 7 through the on-board network 8. On the other hand, instead of the reaction force system RS etc. that are absent, the factory equipment Feq is connected to the turning system TS. The factory equipment Feq simulates the reaction force system RS, the start switch 48, the vehicle control device 7, etc. and serves as an electric power source of the turning system TS. For example, the CPU 60*a* in the turning control unit 60 can determine whether the power source is on, as well as can receive inputs of the steering information Ss and vehicle information Svc through the factory equipment Feq as information required in the initial check process. Thus, even in the in-factory step, the CPU 60*a* can execute the processes of determining whether the power source is on (step 100), the initial check process (step 102), and determining whether the completion information lc is written in the contents of the learning state information L (step 104).

In-Factory Turning Process

Figure 5:
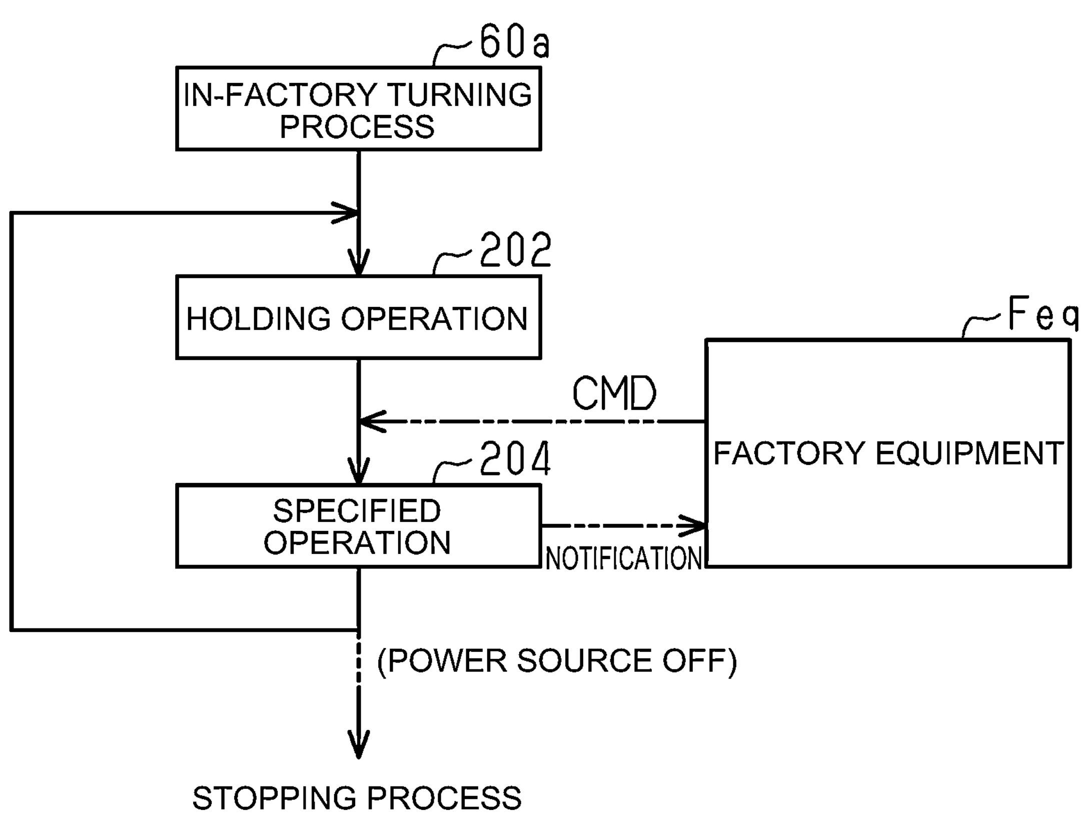
FIG. 5 is a flowchart for describing a processing procedure of a turning control process relating to the setting work of FIG. 4.

As shown in FIG. 5, the in-factory turning process that the CPU 60*a* executes includes processes relating to a holding operation and specified operations. The factory equipment Feq outputs the command signals CMD for ordering operations of the specified operations.

The command signals CMD include, for example, the three types of a command signal CMD1, a command signal CMD2, and a command signal CMD3. The three types of the command signals CMD1, CMD2, CMD3 order specified operations that are different from one another in the operation condition of the rack shaft 22. The operation condition of the rack shaft 22 ordered by the command signal CMD1 is an end contact condition in which the rack shaft 22 is moved to each of the left and right motion limits 221, 22*r*. The operation condition of the rack shaft 22 ordered by the command signal CMD2 is a return-to-midpoint condition in which the rack shaft 22 is moved to the rack neutral position. The operation condition of the rack shaft 22 ordered by the command signal CMD3 is a unidirectional motion condition in which the rack shaft 22 is moved little by little in one direction. In the in-factory step, the CPU 60*a* controls driving of the turning-side motor 32 to control the motion of the rack shaft 22 that is the control target based on the command signals CMD.

More specifically, after setting the setting mode Mf, the CPU 60*a* first temporarily stores, in the memory 60*b*, a prespecified initial reference value θnt0 as a temporary value of the turning reference value θnt. Then, the CPU 60*a* executes a holding operation process relating to the holding operation (step 202).

The holding operation process in step 202 includes a process of referring to the rotation angle θb input from the turning-side rotation angle sensor 43, the pinion absolute rotation angle θabp input from the pinion absolute angle sensor 45, and the initial reference value θnt0 stored in the memory 60*b*. The holding operation process includes a process of calculating an in-factory-step control angle θfp from the rotation angle θb, the pinion absolute rotation angle θabp, and the initial reference value θnt0. The holding operation process includes a process of calculating the control signal MSt by executing feedback control such that the in-factory-step control angle θfp retains a present value. Thus, the CPU 60*a* controls driving of the turning-side motor 32 so as to restrict the motion of the rack shaft 22 that is the control target.

Next, with an input of the command signal CMD as a trigger, the CPU 60*a* executes a specified operation process relating to the specified operation (step 204). In the specified operation process in step 204, a process according to the command signal CMD is executed. The specified operation process will be described in detail later. The CPU 60*a* includes a process of, during execution of the specified operation process, notifying the factory equipment Feq of the effect that this process is being executed. While the factory equipment Feq is notified by the CPU 60*a* of the effect that the specified operation process is being executed, the factory equipment Feq determines that the specified operation ordered in step 204 is being performed.

In step 204, the CPU 60*a* includes a process of forcibly ending the specified operation process if the specified operation process cannot be completed when a specified time has been reached since the start of this process. When the CPU 60*a* forcibly ends the specified operation process, the CPU 60*a* notifies the factory equipment Feq of the effect that this process is to be forcibly ended without being completed. Thereafter, the CPU 60*a* executes the holding operation process, i.e., the process of step 202. When the factory equipment Feq is notified by the CPU 60*a* of the effect that the process is to be forcibly ended, the factory equipment Feq determines that the specified operation ordered in step 204 has not been completed.

On the other hand, the CPU 60*a* includes a process of, when the specified operation process has been completed in step 204, notifying the factory equipment Feq of the effect that this process has been completed. When the factory equipment Feq is notified by the CPU 60*a* of the effect that the process has been completed, the factory equipment Feq determines that the specified operation ordered in step 204 has been completed. Thereafter, the CPU 60*a* executes the holding operation process, i.e., the process of step 202. When the power source is turned off, the CPU 60*a* executes the stopping process (step 112).

At the start of processing of the in-factory turning process and after completion of the specified operation process, the CPU 60*a* executes the holding operation process, i.e., the process of step 202. The CPU 60*a* interposes the holding operation between the specified operations while the specified operations are continuously ordered. Thus, for the specified operations of the rack shaft 22 in the in-factory step, the holding operation is an initial state.

The CPU 60*a* includes a process of, after setting the setting mode Mf, when the CPU 60*a* has determined in the initial check process that the CPU 60*a* and the memory 60*b* cannot operate normally, notifying the factory equipment Feq of that effect. Thereafter, the CPU 60*a* executes the stopping process (step 112) as with the case where the power source is turned off. When the factory equipment Feq is notified by the CPU 60*a* that normal operation is not possible, the factory equipment Feq performs a fail-safe action such as refraining from ordering the specified operation by the command signal CMD.

Processing Procedure of Learning Operation

Figure 6:
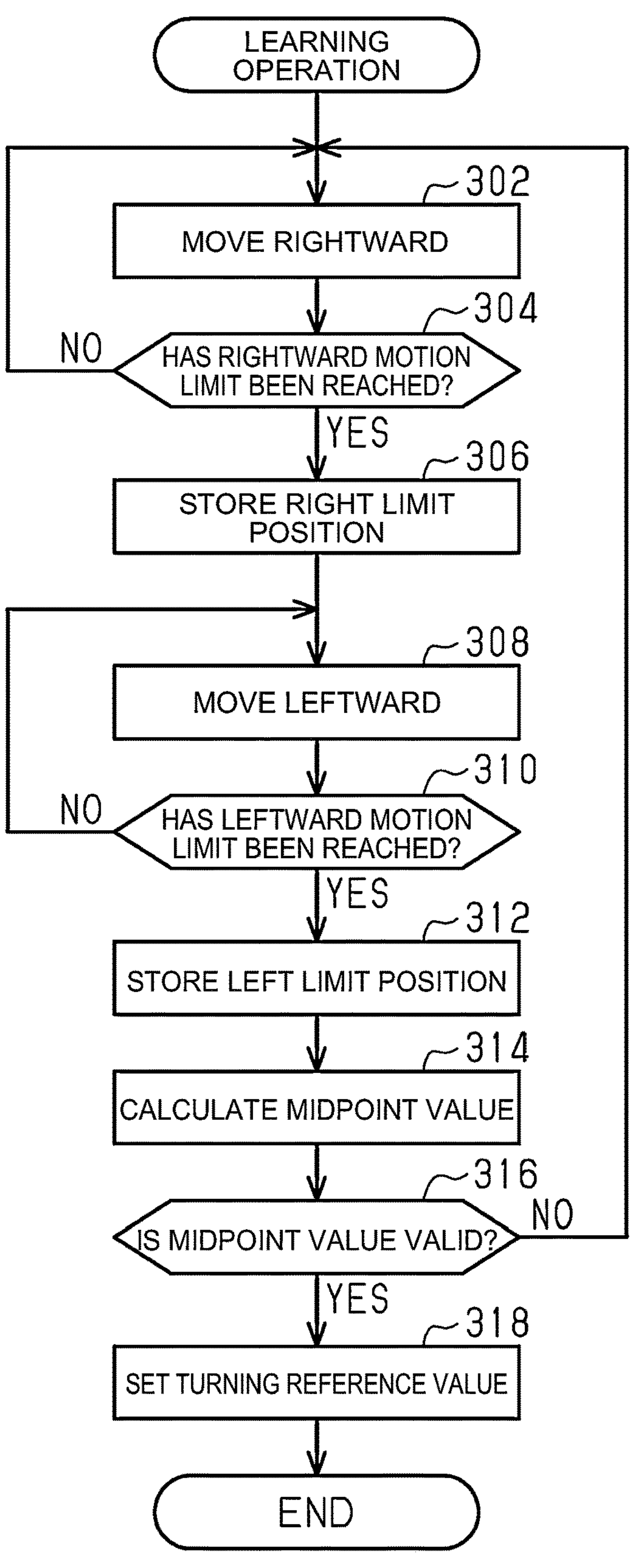
FIG. 6 is a flowchart for describing a processing procedure of a learning operation.

FIG. 6 shows one example of the processing procedure of the specified operation process when the end contact condition is ordered based on the command signal CMD1. In this specified operation process, the CPU 60*a* sets the turning reference value θnt corresponding to the rack neutral position by operating the rack shaft 22 in the end contact condition. In this embodiment, operating the rack shaft 22 in the end contact condition is a learning operation for setting the turning reference value θnt.

As shown in FIG. 6, when the specified operation as the learning operation is ordered, the CPU 60*a* moves the rack shaft 22 rightward that is a first direction that is one of left and right directions (step 302). In step 302, the CPU 60*a* calculates the control signal MSt for automatically moving the rack shaft 22 rightward. For example, the CPU 60*a* includes a process of calculating the control signal MSt by executing feedback control such that the in-factory-step control angle θfp adapts to a target angle θfp*. The target angle θfp* is a value obtained by adding an absolute value of a design value for the entire motion range of the rack shaft 22 to the value of the in-factory-step control angle θfp at the time of processing of step 302.

Next, the CPU 60*a* determines whether the rack shaft 22 has reached the rightward motion limit 22*r* (step 304). In step 304, the CPU 60*a* monitors, for example, the currents iu2, iv2, iw2 and an angular speed ωfp that is an amount of change in the in-factory-step control angle θfp.

The CPU 60*a* includes a process of determining whether the absolute value of a rack axial force Rt obtained by converting the currents iu2, iv2, iw2 into an axial force of the rack shaft 22 has approached a predetermined range without exceeding an axial force threshold value Rth. Determining whether the absolute value of the rack axial force Rt has approached the predetermined range without exceeding the axial force threshold value Rth is equivalent to determining whether load on the turning-side motor 32 has increased due to end contact. For example, the axial force threshold value Rth is a value within an experimentally obtained range within which damage due to the impact of end contact is small. The axial force threshold value Rth is a value within a range obtained on the assumption of a state where the turning wheels 5 are absent, and is a value that is small compared with when a state after shipment to market where the turning wheels 5 are present is assumed.

The CPU 60*a* includes a process of determining whether the absolute value of the angular speed ωfp is smaller than an angular speed threshold value ωth. For example, the angular speed threshold value ωth is a value within an experimentally obtained range within which the rack shaft 22 is not moving. Determining whether the absolute value of the angular speed ωfp is smaller than the angular speed threshold value ωth is equivalent to determining whether the rack shaft 22 is stationary due to end contact.

The CPU 60*a* includes a process of, when the CPU 60*a* determines that the load on the turning-side motor 32 has increased based on the currents iu2, iv2, iw2 and that the rack shaft 22 is stationary based on the absolute value of the angular speed ωfp, determining that the rack shaft 22 has reached the rightward motion limit 22*r*.

Next, when the CPU 60*a* determines that the rack shaft 22 has not reached the rightward motion limit 22*r* (step 304: NO), the CPU 60*a* repeatedly executes the processes of step 302 and step 304. On the other hand, when the CPU 60*a* determines that the rack shaft 22 has reached the rightward motion limit 22*r* (step 304: YES), the CPU 60*a* temporarily stores a right limit position θrl (step 306). In step 306, the CPU 60*a* temporarily stores, as the right limit position θrl, the pinion absolute rotation angle θabp at the time of determining that the rightward motion limit 22*r* has been reached.

Next, the CPU 60*a* moves the rack shaft 22 leftward that is a second direction other than the rightward direction (step 308). In step 308, the CPU 60*a* calculates the control signal MSt for automatically moving the rack shaft 22 leftward. For example, the CPU 60*a* includes a step of calculating the control signal MSt by executing feedback control such that the in-factory-step control angle θfp adapts to the target angle θfp* as in the process of step 302. The target angle θfp* is a value obtained by subtracting the absolute value of the design value for the entire motion range of the rack shaft 22 from the value of the in-factory-step control angle θfp at the time of processing of step 308.

Next, the CPU 60*a* determines whether the rack shaft 22 has reached the leftward motion limit 221 (step 310). In step 310, the CPU 60*a* monitors, for example, the currents iu2, iv2, iw2 and the angular speed ωfp that is the amount of change in the in-factory-step control angle θfp as in the process of step 304.

Next, when the CPU 60*a* determines that the rack shaft 22 has not reached the leftward motion limit 221 (step 310: NO), the CPU 60*a* repeatedly executes the processes of step 308 and step 310. On the other hand, when the CPU 60*a* determines that the rack shaft 22 has reached the leftward motion limit 221 (step 310: YES), the CPU 60*a* temporarily stores a left limit position ell (step 312). In step 312, the CPU 60*a* temporarily stores, as the left limit position θll, the pinion absolute rotation angle θabp at the time of determining that the leftward motion limit 221 has been reached.

Next, the CPU 60*a* calculates a midpoint value θc (step 314). In step 314, the CPU 60*a* calculates, as the midpoint value θc, a value corresponding to half of the sum of the right limit position θrl temporarily stored in step 306 and the left limit position θll temporarily stored in step 312. This is the same as adding a value corresponding to half of a difference from the right limit position θrl to the left limit position ell to the left limit position θll. The absolute value of a difference between the midpoint value θc and the right limit position θrl and the absolute value of a difference between the midpoint value θc and the left limit position ell are equal to each other.

Next, the CPU 60*a* determines validity of the midpoint value θc (step 316). In step 316, the CPU 60*a* determines whether the midpoint value θc obtained in step 314 is a value within a predetermined range that is specified beforehand. The CPU 60*a* includes a process of determining whether the midpoint value θc is larger than a lower threshold value θcth1 and smaller than an upper threshold value θcth2. For example, as the lower threshold value θcth1 and the upper threshold value θcth2, values within a range are set which is obtained with a tolerance taken into account and within which, for the pinion absolute rotation angle θabp, the midpoint value θc can be determined to be a design value for the rack neutral position.

Next, when the CPU 60*a* determines that the midpoint value θc is not valid (step 316: NO), the CPU 60*a* repeatedly executes the processes of step 302 and the subsequent steps. On the other hand, when the CPU 60*a* determines that the midpoint value θc is valid (step 316: YES), the CPU 60*a* sets the midpoint value θc as the turning reference value θnt (step 318), and ends this process and moves to another process. In step 318, the CPU 60*a* writes the midpoint value θc in the turning reference value θnt and writes the completion information lc in the contents of the learning state information L. At the timing of step 318, the CPU 60*a* outputs information showing completion of the learning operation to the factory equipment Feq (step 204). The turning reference value θnt thus obtained is a value corresponding to the rack neutral position.

Processing Procedure of Return-to-Midpoint Operation

Figure 7:
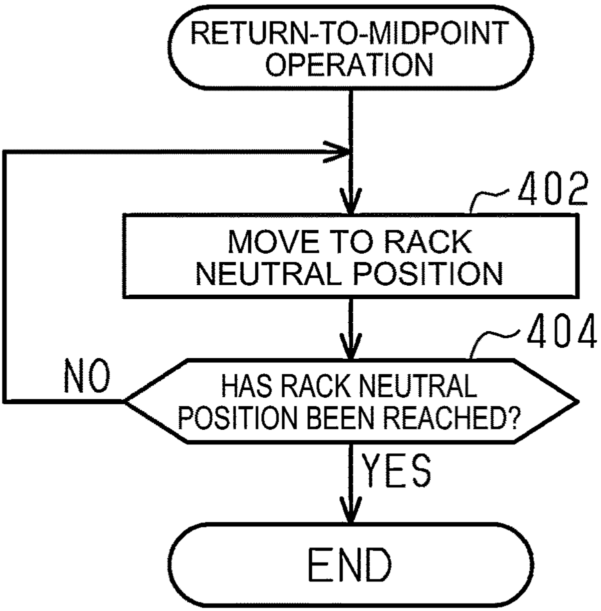
FIG. 7 is a flowchart for describing a processing procedure of a return-to-midpoint operation.

FIG. 7 shows one example of the processing procedure of the specified operation process when the return-to-midpoint condition is ordered based on the command signal CMD2. In this process, the CPU 60*a* moves the rack shaft 22 to the rack neutral position by operating the rack shaft 22 in the return-to-midpoint condition. In this embodiment, operating the rack shaft 22 in the return-to-midpoint condition is the return-to-midpoint operation.

As shown in FIG. 7, when the specified operation as the return-to-midpoint operation is ordered, the CPU 60*a* moves the rack shaft 22 to the rack neutral position (step 402). In step 402, the CPU 60*a* calculates the control signal MSt for automatically moving the rack shaft 22 to a position corresponding to the turning reference value θnt. For example, the CPU 60*a* includes a process of calculating the control signal MSt by executing feedback control such that the in-factory-step control angle θfp adapts to a value corresponding to the turning reference value θnt. Before the process of step 318, the turning reference value θnt is the initial reference value θnt0, and after the process of step 318, the turning reference value θnt is the midpoint value θc set in step 318.

Next, the CPU 60*a* determines whether the rack shaft 22 has reached the rack neutral position (step 404). In step 404, the CPU 60*a* monitors whether the in-factory-step control angle θfp has matched a value corresponding to the turning reference value θnt. The CPU 60*a* includes a process of, when the CPU 60*a* determines that the in-factory-step control angle θfp has matched the value corresponding to the turning reference value θnt, determining that the rack shaft 22 has reached the rack neutral position.

Next, when the CPU 60*a* determines that the rack shaft 22 has not reached the rack neutral position (step 404: NO), the CPU 60*a* repeatedly executes the processes of step 402 and step 404. On the other hand, when the CPU 60*a* determines that the rack shaft 22 has reached the rack neutral position (step 404: YES), the CPU 60*a* ends this process and moves to another process. At the timing of step 404, the CPU 60*a* outputs information showing completion of the return-to-midpoint operation to the factory equipment Feq (step 204).

Processing Procedure of Unidirectional Operation

Figure 8:
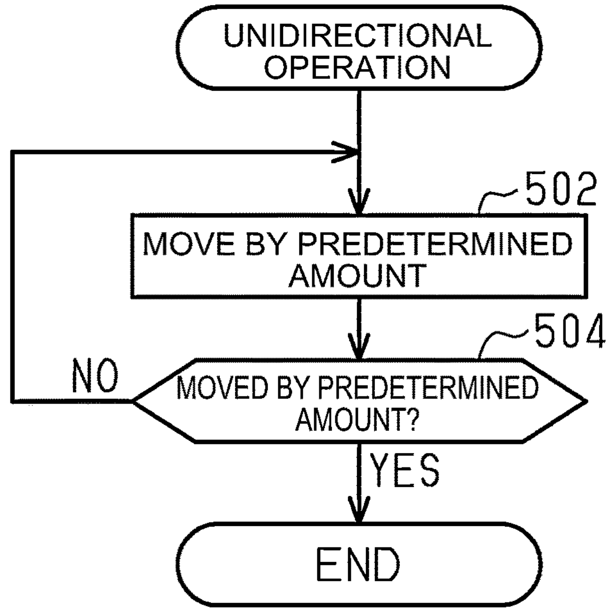
FIG. 8 is a flowchart for describing a processing procedure of a unidirectional operation.

FIG. 8 shows one example of the processing procedure of the specified operation process when the unidirectional motion condition is ordered based on the command signal CMD3. In this process, the CPU 60*a* moves the rack shaft 22 by a predetermined amount by operating the rack shaft 22 in the unidirectional motion condition. In this embodiment, operating the rack shaft 22 in the unidirectional motion condition is the unidirectional operation.

As shown in FIG. 8, when the specified operation as the unidirectional operation is ordered, the CPU 60*a* moves the rack shaft 22 by the predetermined amount (step 502). In step 502, the CPU 60*a* calculates the control signal MSt for automatically moving the rack shaft 22 in either the left or right direction ordered by the command signal CMD3. For example, the CPU 60*a* includes a process of calculating the control signal MSt by executing feedback control such that the in-factory-step control angle θfp adapts to a value that leads to a change by a predetermined angle in either the right direction or the left direction. The predetermined angle may be a prespecified fixed value or may be a variable value that can be ordered by the command signal CMD3.

Next, the CPU 60*a* determines whether the rack shaft 22 has moved by the predetermined amount (step 504). In step 504, the CPU 60*a* monitors whether the in-factory-step control angle θfp has matched the value that leads to a change by the predetermined angle ordered in step 502. The CPU 60*a* includes a process of, when the CPU 60*a* determines that the in-factory-step control angle θfp has matched the value that leads to a change by the predetermined angle ordered in step 502, determining that the rack shaft 22 has moved by the predetermined amount.

Next, when the CPU 60*a* determines that the rack shaft 22 has not moved by the predetermined amount (step 504: NO), the CPU 60*a* repeatedly executes the processes of step 502 and step 504. On the other hand, when the CPU 60*a* determines that the rack shaft 22 has moved by the predetermined amount (step 504: YES), the CPU 60*a* ends this process and moves to another process. At the timing of step 504, the CPU 60*a* outputs information showing completion of the unidirectional operation to the factory equipment Feq (step 204).

Operation in In-Factory Turning Process

Figure 9:
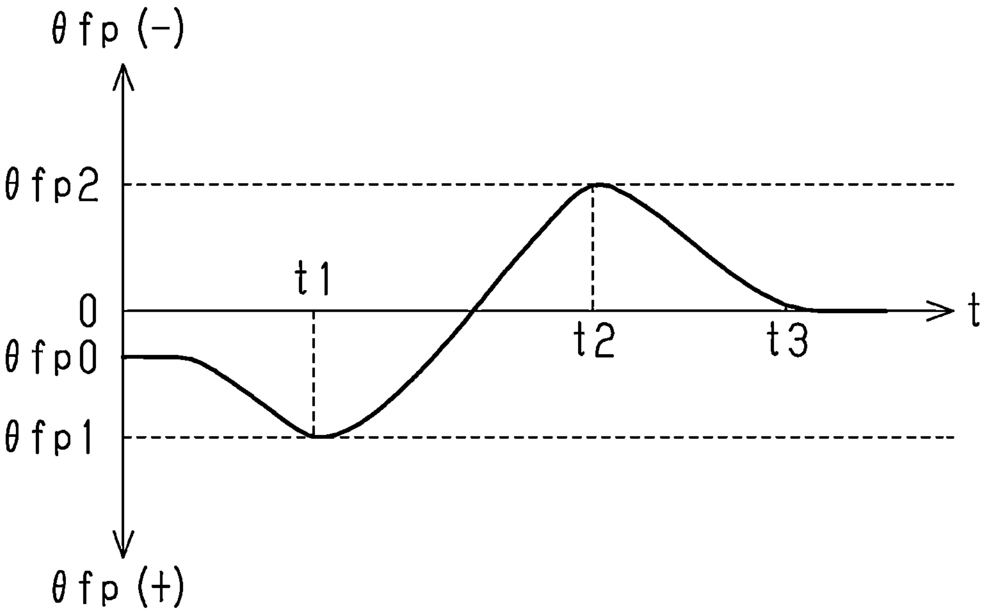
FIG. 9 is a graph for describing how an in-factory-step control angle changes while the learning operation and the return-to-midpoint operation are performed.

For example, FIG. 9 shows one example of how the in-factory-step control angle θfp changes while the learning operation and the return-to-midpoint operation are performed.

When the learning operation is started, the rack shaft 22 starts to move automatically rightward from the holding position that is the holding state. During a period until time t1, the in-factory-step control angle θfp changes toward an increasing side (in FIG. 9, "θfp (+)"), from a start angle θfp0 corresponding to the holding position toward a corresponding angle θfp1 corresponding to the rightward motion limit 22*r*.

When the rack shaft 22 reaches the rightward motion limit 22*r*, the motion thereof stops automatically. This is because, as the rack shaft 22 reaches the rightward motion limit 22*r*, it is determined that the load on the turning-side motor 32 has increased based on the currents iu2, iv2, iw2 and that the rack shaft 22 is stationary based on the absolute value of the angular speed ωfp. In this case, the in-factory-step control angle θfp reaches the corresponding angle θfp1 and does not change thereafter. The pinion absolute rotation angle θabp at that time is temporarily stored as the right limit position θrl.

Next, the rack shaft 22 starts to move automatically leftward from the rightward motion limit 22*r*. During a period until time t2, the in-factory-step control angle θfp changes toward a decreasing side (in FIG. 9, "θfp (−)"), from the corresponding angle θfp1 toward a corresponding angle θfp2 corresponding to the leftward motion limit 221.

When the rack shaft 22 reaches the leftward motion limit 221, the motion thereof stops automatically. This is because, as the rack shaft 22 reaches the leftward motion limit 221, it is determined that the load on the turning-side motor 32 has increased based on the currents iu2, iv2, iw2 and that the rack shaft 22 is stationary based on the absolute value of the angular speed ωfp. In this case, the in-factory-step control angle θfp reaches the corresponding angle θfp2 and does not change thereafter. The pinion absolute rotation angle θabp at that time is temporarily stored as the left limit position ell. Along with this, the turning reference value θnt and the completion information lc are written in the memory 60*b*, which ends the learning operation. Thereafter, the rack shaft 22 is put in the holding state at the leftward motion limit 221.

Next, when the return-to-midpoint operation is started, the rack shaft 22 starts to move automatically rightward from the leftward motion limit 221 at which the rack shaft 22 is in the holding state. During a period until time t3, the in-factory-step control angle θfp changes toward the increasing side (in FIG. 9, "θfp (+)"), from the corresponding angle θfp2 toward the value corresponding to the turning reference value θnt (in FIG. 9, "0").

When the rack shaft 22 reaches the position corresponding to the turning reference value θnt, i.e., the rack neutral position (in FIG. 9, "0"), the motion thereof stops automatically. This is because it is determined that the in-factory-step control angle θfp matches the value corresponding to the turning reference value θnt. In this case, the in-factory-step control angle θfp reaches the value corresponding to the turning reference value θnt and does not change thereafter, which ends the return-to-midpoint operation. Thereafter, the rack shaft 22 is put in the holding state at the rack neutral position.

Figure 10:
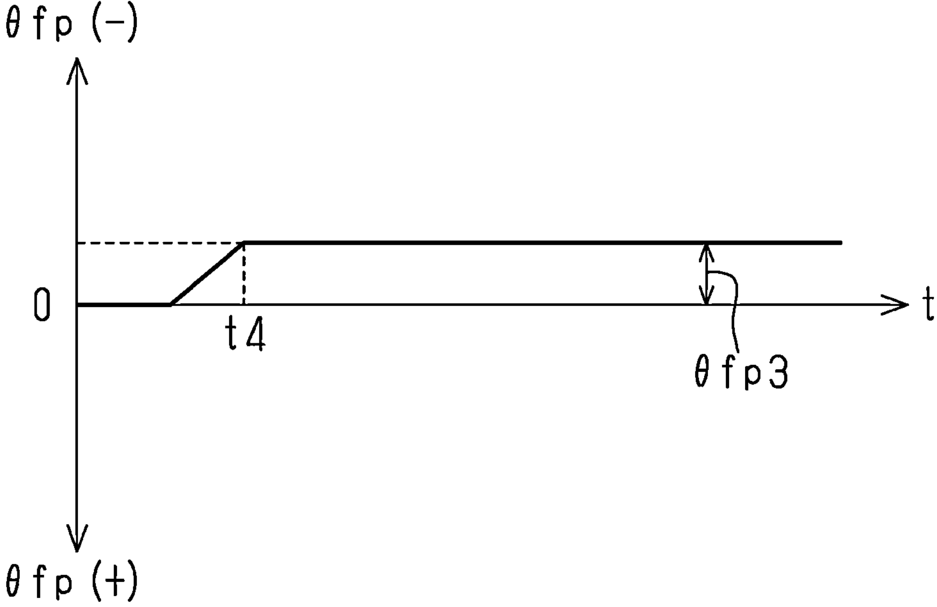
FIG. 10 is a graph for describing how the in-factory-step control angle changes while the unidirectional operation is performed.

Next, when another specified operation starts, the rack shaft 22 starts to move automatically from the rack neutral position at which the rack shaft 22 is in the holding state. For example, FIG. 10 shows one example of how the in-factory-step control angle θfp changes while the unidirectional operation is performed. In this case, the command signal CMD3 indicates changing the in-factory-step control angle θfp by a predetermined angle (in FIG. 10, "θfp3") in the left direction.

When the unidirectional operation is started, the rack shaft 22 starts to move automatically leftward from the rack neutral position at which the rack shaft 22 is in the holding state. During a period until time t4, the in-factory-step control angle θfp changes by the predetermined angle toward the decreasing side (in FIG. 10, "θfp (−)"), leftward from the rack neutral position (in FIG. 10, "0").

When the rack shaft 22 has moved leftward by the predetermined amount, the motion thereof stops automatically. This is because it is determined that the in-factory-step control angle θfp has matched a value corresponding to a change by the predetermined angle leftward. In this case, the in-factory-step control angle θfp reaches the value corresponding to a change by the predetermined angle leftward and does not change thereafter, which ends the unidirectional operation. Thereafter, the rack shaft 22 is put in the holding state at a position reached by moving leftward by the predetermined amount.

Workings of Embodiment

According to this embodiment, the reaction force system RS and the turning wheels 5 are incorporated after the turning system TS is shipped from factory in the state where the completion information lc is written in the contents of the learning state information L. In the turning system TS thus applied to the vehicle steering system 2, the state where the completion information lc is written in the contents of the learning state information L is retained after shipment to market, so that even when the power source is repeatedly turned on and off, only the normal control mode Mn is set. In other words, in the turning system TS, the state where the completion information lc is written in the contents of the learning state information L is retained after shipment to market, so that even when the power source is repeatedly turned on and off, the setting mode Mf is not set.

Therefore, it is possible to make the turning unit 6 operate according to each situation in the setting mode Mf and the normal control mode Mn. Thus, in the setting mode Mf, the CPU 60*a* in the turning control unit 60 can execute control based on the assumption of work in the in-factory step before shipment to market, and in the normal control mode Mn, the CPU 60*a* can execute control based on the assumption of use after shipment to market, after the in-factory step is gone through. In short, the setting mode Mf or the normal control mode Mn is exclusively set according to the situation.

Advantages of Embodiment (1-1) The CPU 60*a* can exclusively set the setting mode Mf or the normal control mode Mn. Such a setting mode Mf or a normal control mode Mn is exclusively set according to the situation, which can reduce the confusion of a worker engaged in the setting work in the in-factory step. Therefore, the setting work in the in-factory step before shipment to market can be appropriately performed.

(1-2) The in-factory turning process includes the process of setting the turning reference value θnt in the memory 60*b* by making the rack shaft 22 perform the learning operation through driving of the turning-side motor 32. Thus, the turning system TS can be proposed that is suited to the setting work that is performed by operating the rack shaft 22 among types of setting work in the in-factory step before shipment to market.

(1-3) The in-factory turning process includes, during the learning operation, the process of acquiring the limit positions θrl, θll and the process of setting the turning reference value θnt. Thus, it is possible to specialize in the setting work for setting the turning reference value θnt among types of setting work that are performed by operating the rack shaft 22.

(1-4) The in-factory turning process includes the process of setting, in the memory 60*b*, the completion information lc showing completion of setting of the turning reference value θnt on the condition that the turning reference value θnt has been set in the memory 60*b* through the learning operation. Thus, the CPU 60*a* in the turning control unit 60 can exclusively set the setting mode Mf or the normal control mode Mn based on the completion information lc, and can automatically perform this setting. This is effective, for example, in automating the in-factory step before shipment to market.

(1-5) The in-factory turning process includes the process of performing the holding operation of holding the rack shaft 22 at the start of the process and each time the specified operation is completed. Thus, the rack shaft 22 is less likely to become displaced due to, for example, impact being exerted from the outside in the in-factory step before shipment to market. As a result, work efficiency in the in-factory step can be improved.

(1-6) In the in-factory step before shipment to market, the CPU 60*a* notifies the factory equipment Feq of the status of the specified operation process relating to the ordered specified operation. Thus, the factory equipment Feq can grasp the status of the turning system TS while giving orders for the specified operation to the CPU 60*a*. Therefore, appropriate coordination between the factory equipment Feq and the turning system TS can be achieved.

Other Embodiments

The above-described embodiment may be changed as follows. The following other embodiments can be combined with one another within such a range that no technical inconsistency arises.

In the in-factory turning process, the process of performing the holding operation may be omitted. In addition, in the in-factory turning process, the holding operation may be performed only at a predetermined timing; for example, the holding operation may be performed only at the start of the process.

In the in-factory turning process, the process of performing the return-to-midpoint operation may be omitted. In addition, in the in-factory turning process, the return-to-midpoint operation may be performed only at a predetermined timing; for example, the return-to-midpoint operation may be performed only at the time of the stopping process when the power source is turned off.

In the in-factory turning process, the process of performing the unidirectional operation may be omitted. In addition, in the in-factory turning process, the unidirectional operation may be performed as an adjustment operation in the case where the midpoint value θc is determined not to be valid during the process relating to the learning operation.

Instead of the completion information lc, non-completion information ln may be written in the contents of the learning state information L. In this case, with a state where the non-completion information ln is written in as an initial state, the non-completion information ln may be deleted from the contents of the learning state information L upon completion of the learning operation. In addition to this, after completion of the initial check process in step 102, the CPU 60*a* may set the setting mode Mf when the non-completion information ln is written in the contents of the learning state information L. In other words, after completion of the initial check process in step 102, the CPU 60*a* may set the normal control mode Mn when the non-completion information ln is not written in the contents of the learning state information L.

The method for realizing exclusive setting of the setting mode Mf or the normal control mode Mn can be changed as appropriate. For example, either the setting mode Mf or the normal control mode Mn may be set based on whether the turning wheels 5 or the reaction force system RS is present or not. In this case, the setting mode Mf should be set on the condition that the turning wheels 5 or the reaction force system RS is absent. Therefore, the normal control mode Mn should be set on the condition that the turning wheels 5 or the reaction force system RS is present. In the other embodiment described here, the configuration relating to the learning state information L can be omitted.

The holding operation process may be a process that is executed as the holding operation is ordered by the command signal CMD from the factory equipment Feq. The process relating to the learning operation may be a process in which the rack shaft 22 is moved leftward first and thereafter the rack shaft 22 is moved rightward. In this case, the process of FIG. 6 should have a configuration in which the processes of steps 308, 310, and 312 are executed before the processes of steps 302, 304, and 306.

The process relating to the learning operation should at least include a process of temporarily storing one of the limit positions θrl, θll. In other words, in the process relating to the learning operation, the process of temporarily storing one of the limit positions θrl, θll need not be performed. For example, when the process of temporarily storing the right limit position θrl is included, the CPU **60*a* may calculate, as the midpoint value θc, a value obtained by subtracting half of the design value for the entire motion range of the rack shaft 22** from the right limit position θrl.

In the process relating to the learning operation, the process of determining the validity of the midpoint value θc need not be performed. In this case, the CPU **60*a* may set the midpoint value θc obtained in step 314** as the turning reference value θnt.

In the process relating to the learning operation, the process of determining whether the rack shaft 22 has reached each of the motion limits 221, **22*r* may be a process of determining whether the absolute values of the currents iu2, iv2, iw2 are equal to or larger than a current threshold value ith. For example, the current threshold value ith should be a value within an experimentally obtained range within which the load on the turning-side motor 32** has increased sufficiently due to end contact.

In the process relating to the learning operation, the process of determining whether the rack shaft 22 has reached each of the motion limits 221, **22*r* may be a process of monitoring only either the currents iu2, iv2, iw2** or the angular speed ωfp that is the amount of change in the in-factory-step control angle θfp.

In the process relating to the learning operation, the process of determining whether the rack shaft 22 has reached each of the motion limits 221, **22*r* may factor in other parameters in addition to the currents iu2, iv2, iw2 and the angular speed ωfp that is the amount of change in the in-factory-step control angle θfp. As the other parameters, for example, amounts of change in the currents iu2, iv2, iw2, the amount of change in the angular speed ωfp, and a time from when the rack shaft 22** started to move are conceivable.

The in-factory turning process may include a process that allows manual setting by a worker in the in-factory step such that a present value of the in-factory-step control angle θfp is set to the turning reference value θnt. In this case, the worker in the in-factory step can set the present value of the in-factory-step control angle θfp to the turning reference value θnt at an arbitrary timing in the course of repeating the unidirectional operation.

In the in-factory step, other than the turning system TS, the reaction force system RS or the turning wheels 5 may be present. Thus, the setting mode Mf may be settable also when the reaction force system RS or the turning wheels 5 are present.

The pinion angle θp may be obtained by converting a detection value of an amount of movement of the rack shaft 22. In this case, a control amount relating to the pinion angle θp etc. are converted by the detection value of the amount of movement of the rack shaft 22.

An amount of shift of the steering wheel 3 is not limited to an amount that is calculated by the process of integrating the rotation angle θa. For example, the amount of shift may be a detection value of a steering angle sensor that directly detects the rotation angle of the steering shaft 11. The steering angle sensor may be provided, for example, on the steering shaft 11, between the steering wheel 3 and the torque sensor 41.

The operation member that the driver operates to steer the vehicle is not limited to the steering wheel 3. The operation member may be, for example, a joystick. The turning-side motor 32 is not limited to a three-phase brushless motor. The turning-side motor 32 may be, for example, a brushed direct-current motor. The other embodiment described here can be applied to the steering-side motor 13 as well.

The turning unit 6 transmits the rotation of the turning-side motor 32 to the conversion mechanism 34 through the transmission mechanism 33. However, the turning unit 6 is not limited thereto, and may be configured to, for example, transmit the rotation of the turning-side motor 32 to the conversion mechanism 34 through a gear mechanism. Further, the turning unit 6 may be configured such that the turning-side motor 32 directly rotates the conversion mechanism 34. In addition, a configuration in which the turning unit 6 includes a second rack-and-pinion mechanism may be adopted, and the turning unit 6 may be configured to convert the rotation of the turning-side motor 32 into reciprocating motion of the rack shaft 22 by the second rack-and-pinion mechanism.

The turning unit 6 is not limited to the configuration in which the right turning wheel 5 and the left turning wheel 5 operate in conjunction with each other. In other words, the right turning wheel 5 and the left turning wheel 5 may be independently controllable.

In the above-described embodiment, the vehicle steering system 2 has a link-less structure in which the steering unit 4 and the turning unit 6 are mechanically always cut off from each other. However, the vehicle steering system 2 is not limited thereto, and may have, for example, a structure in which the steering unit 4 and the turning unit 6 can be mechanically cut off from each other by a clutch.

What is claimed is:

1. A turning system applied to a vehicle steering system, comprising:

a turning unit that operates to turn a turning wheel of the vehicle, the vehicle steering system having a structure in which a power transmission path between the turning unit and a steering unit steered by a driver is cut off;

one or more processors that control the operation of the turning unit; and a memory that stores control information that the one or more processors use to control the operation of the turning unit, wherein:

the one or more processors are configured to execute a mode setting process including setting a control mode in which the turning unit is operated to a setting mode or a normal control mode, the setting mode is a mode that is settable in an in-factory step before the turning unit is shipped to market, and is a mode in which setting work for setting the control information in the memory by operating the turning unit is performed, the normal control mode is a mode that is settable after the in-factory step is gone through, and is a mode in which the turning unit is controlled to operate using the control information, the mode setting process includes exclusively setting the setting mode or the normal control mode, the turning unit includes a turning shaft that operates to turn the turning wheel, and a turning-side motor that generates motive power for operating the turning shaft, the one or more processors are configured to execute an in-factory turning process involved in performing the setting work, and the in-factory turning process includes a process of setting the control information in the memory by making the turning shaft perform at least one specified operation that is specified beforehand through driving of the turning-side motor, the setting work includes work for setting a reference value that is a value linked to a mechanical state of the turning unit in the memory as the control information, the reference value is a value indicating a moving-straight-forward state that is a turning state of the turning shaft when the vehicle moves straight forward, the specified operations include a learning operation of moving the turning shaft to a motion limit in each of a first direction and a second direction, the in-factory turning process includes acquiring, during the learning operation, a limit position in each of the first and second directions that is a position of the turning shaft at the motion limit in each of the first and second directions, and setting the reference value based on the limit position acquired in each of the first and second directions, the in-factory turning process further includes setting, in the memory, completion information showing completion of setting of the reference value on a condition that the reference value has been set in the memory through the learning operation, the mode setting process further includes setting the normal control mode when the completion information is set in the memory, and setting the setting mode when the completion information is not stored in the memory, and, the completion information, once set in the memory, is retained when power to the turning system is turned on and off and is retained when a battery that serves as a power source for the turning system is replaced, such that the completion information is not deletable or initializable after being set in the memory, and the in-factory turning process further includes determining that the turning shaft has reached the motion limit in each of the first direction and the second direction based on both:

a determination that a load on the turning-side motor has increased based on currents flowing through the tuming-side motor; and a determination that the turning shaft is stationary based on an angular speed associated with a position of the turning shaft being smaller than an angular speed threshold value.

2. The turning system according to claim 1, wherein the in-factory turning process further includes performing a holding operation of holding a state of the turning shaft at start of the process and each time the specified operation is completed.

3. A control information setting method for setting control information that is applied to a vehicle steering system having a structure in which a power transmission path between a steering unit that is steered by a driver and a turning unit that operates to turn a turning wheel of a vehicle is cut off, the control information being information that is stored in a memory belonging to a turning system configured to include the turning unit and that is used by one or more processors belonging to the turning system to control the operation of the turning unit, the control information setting method comprising, by one or more processors, executing a mode setting process including setting a control mode in which the turning unit is operated to a setting mode or a normal control mode, and executing an in-factory turning process of operating the turning unit to perform setting work for setting the control information in the memory by operating the turning unit, in the setting mode that is settable in an in-factory step before the turning unit is shipped to market, wherein the normal control mode is a mode that is settable after the in-factory step is gone through, and is a mode in which the turning unit is controlled to operate using the control information, and the mode setting process includes exclusively setting the setting mode or the normal control mode, wherein:

the in-factory turning process includes setting the control information in the memory by making a turning shaft of the turning unit that operates to turn the turning wheel perform at least one specified operation that is specified beforehand through driving of a turning-side motor of the turning unit, the setting work includes work for setting a reference value that is a value linked to a mechanical state of the turning unit in the memory as the control information, the reference value is a value indicating a moving-straight-forward state that is a turning state of the turning shaft when the vehicle moves straight forward, the specified operations include a learning operation of moving the turning shaft to a motion limit in each of a first direction and a second direction, the in-factory turning process includes acquiring, during the learning operation, a limit position in each of the first and second directions that is a position of the turning shaft at the motion limit in each of the first and second directions, and setting the reference value based on the limit position acquired in each of the first and second directions, the in-factory turning process further includes setting, in the memory, completion information showing completion of setting of the reference value on a condition that the reference value has been set in the memory through the learning operation, the mode setting process further includes setting the normal control mode when the completion information is set in the memory, and setting the setting mode when the completion information is not stored in the memory, and, the completion information, once set in the memory, is retained when power to the turning system is turned on and off and is retained when a battery that serves as a power source for the turning system is replaced, such that the completion information is not deletable or initializable after being set in the memory, and the in-factory turning process further includes determining that the turning shaft has reached the motion limit in each of the first direction and the second direction based on both:

a determination that a load on the turning-side motor has increased based on currents flowing through the turning-side motor; and a determination that the turning shaft is stationary based on an angular speed associated with a position of the turning shaft being smaller than an angular speed threshold value.

4. The turning system according to claim 1, wherein the in-factory turning process further includes:

calculating a midpoint value based on the limit position acquired in each of the first and second directions;

determining whether the midpoint value is within a predetermined range between a lower threshold value and an upper threshold value; and repeating the learning operation when the midpoint value is determined not to be within the predetermined range, and setting the reference value based on the midpoint value when the midpoint value is determined to be within the predetermined range.

* * * * *